US009319909B2

(12) United States Patent
Yamada

(10) Patent No.: US 9,319,909 B2
(45) Date of Patent: Apr. 19, 2016

(54) DEVICES FOR RADIO LINK MONITORING

(75) Inventor: Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 301 days.

(21) Appl. No.: 13/249,191

(22) Filed: Sep. 29, 2011

(65) Prior Publication Data

US 2013/0083675 A1    Apr. 4, 2013

(51) Int. Cl.
*H04J 3/06* (2006.01)
*H04W 4/00* (2009.01)
*H04W 24/08* (2009.01)

(52) U.S. Cl.
CPC ..................................... *H04W 24/08* (2013.01)

(58) Field of Classification Search
CPC .............. H04W 56/00; H04W 56/001; H04W 56/0005; H04W 56/0045; H04W 72/0406; H04W 52/14; H04W 52/146; H04W 52/18; H04W 52/242; H04W 52/34
USPC ................................. 370/328–349, 503–515; 455/422.1–426.1, 450–452.2
See application file for complete search history.

(56) References Cited

U.S. PATENT DOCUMENTS

| 8,542,654 | B1* | 9/2013 | Dinan | H04W 56/0005 370/331 |
| 8,989,013 | B2* | 3/2015 | Futaki | H04J 11/0069 370/236 |
| 2011/0134774 | A1* | 6/2011 | Pelletier et al. | 370/329 |
| 2012/0082107 | A1* | 4/2012 | Ou et al. | 370/329 |
| 2013/0028069 | A1* | 1/2013 | Pelletier et al. | 370/216 |
| 2013/0028239 | A1* | 1/2013 | Dinan | 370/336 |
| 2013/0155891 | A1* | 6/2013 | Dinan | 370/252 |

FOREIGN PATENT DOCUMENTS

| WO | 2010/124228 | 10/2010 |
| WO | 2010/148404 | 12/2010 |

OTHER PUBLICATIONS

Potevio, Maintenance of Time Alignment Timer in Case of Multi-TA, 3Gpp TSG-RAN WG2 Meeting #75 R2-114145, 3GPP, Aug. 26, 2011, p. 1-p. 3.
Alcatel-Lucent, Alcatel-Lucent Shanghai Bell, Initiating timing alignment for SCell in multiple TA, 3GPP TSG-RAN WG2 Meeting #74 R2-113235, 3GPP, May 13, 2011, p. 1-p. 6.
International Search Report issued for International Patent Application PCT/JP2012/005698 on Oct. 2, 2012.
Qualcomm Incorporated, NTT DoCoMo Inc., "RL Monitoring for Pathloss Reference SCell," 3GPP TSG-RAN WG2 Meeting #72, R2-106243, Nov. 2010.
NTT DoCoMo, Inc., "SCell Radio Link Monitoring," 3GPP TSG-RAN2 #72, R2-106624, Nov. 2010.
NTT DoCoMo, Inc., "CA Support for Multi-TA," 3GPP TSG-RAN2 #69, R2-101567, Feb. 2010.

(Continued)

*Primary Examiner* — Thai Hoang
(74) *Attorney, Agent, or Firm* — Austin Rapp & Hardman

(57) ABSTRACT

A user equipment (UE) configured for radio link monitoring is described. The UE includes a processor and instructions stored in memory that is in electronic communication with the processor. The UE monitors a radio link quality for a secondary cell (SCell). The UE also determines whether a physical layer problem is detected based on the radio link quality. If a physical layer problem is detected, the UE stops a time alignment timer (TAT) of the SCell or sets the time alignment timer (TAT) of the SCell as expired.

7 Claims, 13 Drawing Sheets

(56) References Cited

OTHER PUBLICATIONS

Qualcomm Incorporated, "Reply LS on RAN2 Status on Carrier Aggregation," 3GPP TSG RAN WG2 Meeeting #67bis, R2-095422, Oct. 2009.

Ericsson, ST Ericsson, "Multiple Timing Advance for Carrier Aggregation," 3GPP TSG-RAN WG2 #69, R2-101196, Feb. 2010.

3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.

3GPP TS 36.331 V9.1.0, "Evolved Universal Terrestrial Radio Access (E-UTRA) Radio Resource Control (RRC); Protocol specification (Release 9)," Dec. 2009.

3GPP TS 36.213 V8.6.0, "Evolved Universal Terrestrial Radio Access (E-UTRA) Physical layer procedures (Release 8)," Mar. 2009.

3GPP TS 36.212 V9.0.0, "Evolved Universal Terrestrial Radio Access (E-UTRA); Multiplexing and Channel Coding (Release 9)," Dec. 2009.

3GPP TS 36.211 V9.0.0, "Evolved Universal Terrestrial Radio Access (E-UTRA); Physical Channels and Modulation (Release 9)," Dec. 2009.

3GPP TS 36.321 V9.1.0, "Evolved Universal Terrestrial Radio Access (E-UTRA) Medium Access Control (MAC) protocol specification (Release 9)," Dec. 2009.

\* cited by examiner

DEVICES FOR RADIO LINK MONITORING

TECHNICAL FIELD

The present disclosure relates generally to communication systems. More specifically, the present disclosure relates to devices for radio link monitoring.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed and/or quality have been sought. However, improvements in communication capacity, speed and/or quality may require increased resources.

For example, wireless communication devices may communicate with one or more devices using multiple channels or cells. However, communicating with one or more devices using multiple channels or cells may pose certain challenges. As illustrated by this discussion, systems and methods that enable or improve communication using multiple channels or cells may be beneficial.

DETAILED DESCRIPTION

Figure 1:
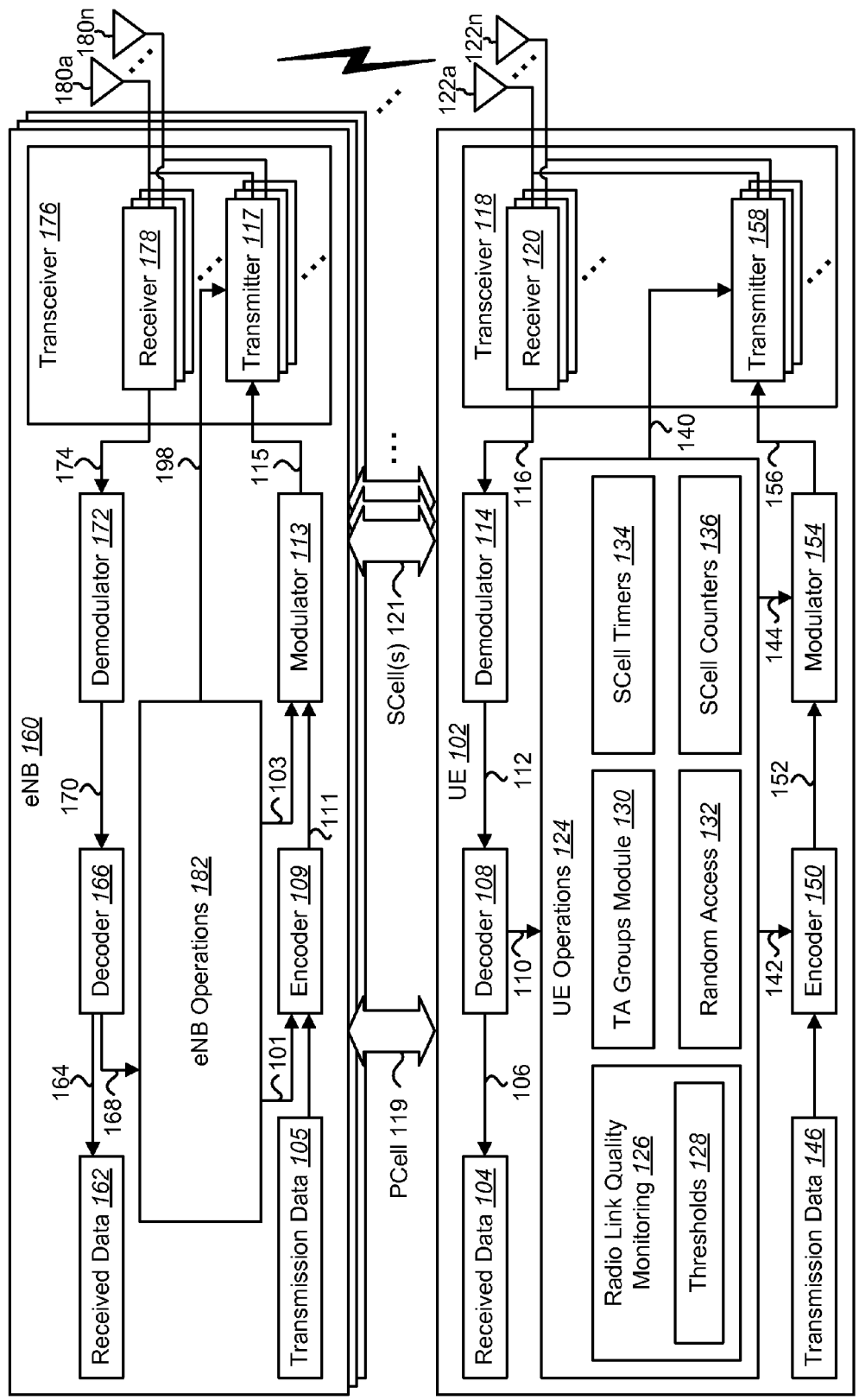
FIG. 1 is a block diagram illustrating one configuration of a user equipment (UE) in which systems and methods for radio link monitoring may be implemented.

A user equipment (UE) configured for radio link monitoring is described. The UE includes a processor and instructions stored in memory that is in electronic communication with the processor. The UE monitors a radio link quality for a secondary cell (SCell). The UE also determines whether a physical layer problem is detected based on the radio link quality. If a physical layer problem is detected, the UE stops a time alignment timer (TAT) of the SCell or sets the time alignment timer (TAT) of the SCell as expired.

If the physical layer problem is indicated, the UE may also stop a random access procedure on the SCell. If the physical layer problem is indicated, the UE may further avoid a random access procedure for the SCell. If the physical layer problem is indicated, the UE may avoid starting a time alignment timer (TAT) when a time alignment (TA) command is received, avoid restarting a TAT when the TA command is received, ignore the TA command, ignore a received downlink control channel (PDCCH) order to initiate random access, avoid monitoring a PDCCH for the SCell, stop sounding reference signal (SRS) transmissions in a corresponding TA group, flush hybrid automatic repeat request (HARQ) buffers for the corresponding TA group, avoid performing any uplink transmission on the SCell or keep reporting feedback information for the SCell.

An sCellDeactivationTimer for the SCell may be set to infinity. The SCell may include a timing reference for a time alignment (TA) group that does not include a primary cell (PCell).

A method for radio link monitoring on a user equipment (UE) is also described. The method includes monitoring a radio link quality for a secondary cell (SCell). The method also includes determining whether a physical layer problem is detected based on the radio link quality. If a physical layer problem is detected, the method includes stopping a time alignment timer (TAT) of the SCell or setting the time alignment timer (TAT) of the SCell as expired.

A non-transitory, tangible computer-readable medium for radio link monitoring is also described. The computer-readable medium includes executable instructions for monitoring a radio link quality for a secondary cell (SCell). The computer-readable medium also includes executable instructions for determining whether a physical layer problem is detected based on the radio link quality. If a physical layer problem is detected, the computer-readable medium includes executable instructions for stopping a time alignment timer (TAT) of the SCell or setting the time alignment timer (TAT) of the SCell as expired.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP standards (e.g., LTE, LTE-Advanced (LTE-A), Release-8, Release-10, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a user equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by a Node B (e.g., eNB) to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells for which the UE is not monitoring the transmission PDCCH. It should be noted that a "cell" may be described in terms of differing dimensions. For example, a "cell" may have temporal, spatial (e.g., geographical) and frequency characteristics. For instance, a spatial characteristic of a cell may be described in terms of size.

The systems and methods disclosed herein may relate to how a user equipment (UE) behaves in case that the UE is configured for multiple timing alignment groups or multiple random access channels. In 3GPP LTE Release-10 (e.g., LTE-A or Advanced E-UTRAN), carrier aggregation is introduced. Furthermore, a primary cell (PCell) and one or more secondary cells (SCells) may be used.

The UE may adjust its uplink transmission timing for a physical uplink control channel (PUCCH), physical uplink shared channel (PUSCH) and/or sounding reference signal (SRS) of the primary cell based on a timing advance command. The timing advance command in a random access response may be transmitted from an eNB to a UE after the UE has sent a random access preamble. The timing advance command (which refers to a timing advance command media access control (MAC) control element) is also transmitted from the eNB to the UE at any time the eNB wants to change the UE's uplink transmission timing. The uplink transmission timing may need to be adjusted from time to time to account for changes in the radio frequency (RF) delay as the relative position of the UE changes in respect to a corresponding eNB. In this manner, the eNB may provide that all signals from any UEs to the eNB reach the eNB at the same time or within a cyclic prefix in an orthogonal frequency division multiplexing (OFDM) symbol.

In the case of a random access response, an 11-bit timing advance command $T_A$ may indicate $N_{TA}$ values by index values of $T_A=0, 1, 2, \ldots, 1282$, where an amount of the time alignment is given by $N_{TA}=T_A \times 16$.

In other cases, a six-bit timing advance command $T_A$ may indicate adjustment of a current $N_{TA}$ value (denoted $N_{TA,old}$) to a new $N_{TA}$ value (denoted $N_{TA,new}$) by index values of $T_A=0, 1, 2, \ldots, 63$, where $N_{TA,new}=N_{TA,old}+(T_A-31) \times 16$. In this case, adjustment of an $N_{TA}$ value by a positive or a negative amount indicates advancing or delaying the uplink transmission timing by a given amount, respectively.

Transmission of an uplink radio frame number i from the UE starts $N_{TA} \times T_s$ seconds before the start of a corresponding downlink radio frame at the UE, where $0 \leq N_{TA} 20512$ and $$T_s = \frac{1}{(15000 \times 2048)} \text{seconds.}$$

In other words, a UE may begin transmitting an uplink radio frame i $N_{TA} \times T_s$ seconds before receiving a corresponding downlink radio frame i. Typically, the uplink (UL) transmission timing for a physical uplink shared channel (PUSCH) and/or sounding reference signal (SRS) of a secondary cell may be the same as that of a primary cell.

Procedures for one or more timers (e.g., time alignment timers) are described herein. In accordance with the systems and methods disclosed herein, a timer may be running once it is started, until it is stopped or until it expires. Otherwise, the timer is not running. A timer may be started if it is not running or restarted if it is running. A timer may be started or restarted from an initial value.

In one configuration of the systems and methods disclosed herein, a UE has a configurable timer, which may be referred to as a time alignment timer, "timeAlignmentTimer" or "TAT." A time alignment timer may be used to control how long a UE is considered uplink time aligned. An eNB may configure a time alignment timer expiry value (e.g., an initial value of a time alignment timer) based on UE mobility or cell size. If a UE's moving speed is quite high, a time alignment timer expiry value may be very short, since the distance between UE and eNB may change rapidly. Currently, an eNB may select a time alignment timer expiry value from 500 milliseconds (ms), 750 ms, 1280 ms, 1920 ms, 2560 ms, 5120 ms, 10240 ms or infinity.

In one configuration, a UE may operate as follows. When a timing advance command MAC control element is received, the UE may apply the timing advance command and start or restart a time alignment timer. When a timing advance command is received in a random access response message and if the random access preamble was not selected by the UE media access control (MAC), the UE may apply the timing advance command and start or restart a time alignment timer.

When a timing advance command is received in a random access response message and a time alignment timer is not running, the UE may apply the timing advance command and start the time alignment timer. In that case, when a contention resolution is considered not successful (e.g., unsuccessful), the UE may stop the time alignment timer. In other cases (e.g., the time alignment timer is running) where the timing advance command was received in a random access response message, the UE may ignore the received timing advance command.

When a time alignment timer expires, the UE may flush all hybrid automatic repeat request (HARQ) buffers, notify radio resource control (RRC) to release a physical uplink control channel (PUCCH) and/or a sounding reference signal (SRS). Furthermore, the UE may clear any configured downlink assignments and uplink grants when a time alignment timer expires. It should be noted that the UE may not perform any uplink transmission except a random access preamble transmission when a time alignment timer is not running (for a corresponding cell, for example).

Multiple uplink time alignment may be needed. Aggregation between cells may be introduced with different transmission and/or reception sites. In this case, a UE may need to have different uplink transmission timing for each cell.

In Release-11, this multiple uplink transmission timing adjustment is investigated. One example of a deployment scenario is that different component carriers could see substantially different propagation environments due to different frequency selective repeaters and hence see different time-of-flights. Another example deployment scenario is that the UE may communicate with two non-collocated sites on two carriers. Such a scenario could occur with remote antennas or remote radio heads.

In Release-10, radio link monitoring and radio link failure handling is done by the UE only in a primary cell (PCell). The downlink radio link quality of the PCell may be monitored by the UE physical layer for the purpose of indicating out-of-sync/in-sync status to higher layers (e.g., radio resource control (RRC) and/or media access control (MAC)).

In non-discontinuous reception (non-DRX) mode operation, the physical layer in the UE shall assess the radio link quality for every radio frame, evaluated over a previous time period, against thresholds (e.g., $Q_{out}$ and $Q_{in}$). In discontinuous reception (DRX) mode operation, the physical layer in the UE may assess radio link quality at least once every DRX period, evaluated over the previous time period, against thresholds (e.g., $Q_{out}$ and $Q_{in}$). If higher-layer signaling indicates certain subframes for restricted radio link monitoring, the radio link quality may not be monitored in any subframe other than those indicated.

The physical layer in the UE may (in radio frames where the radio link quality is assessed) indicate out-of-sync to higher layers when the radio link quality is worse than the threshold $Q_{out}$. When the radio link quality is better than the threshold $Q_{in}$, the physical layer in the UE may (in radio frames where the radio link quality is assessed) indicate in-sync to higher layers.

The detection of physical layer problems in RRC_CONNECTED in the RRC layer may be defined as receiving a number of (e.g., $N_{310}$) consecutive "out-of-sync" indications for the PCell from lower layers (e.g., the physical layer). If physical layer problems are detected, the UE may start a timer (e.g., $T_{310}$).

Recovery from physical layer problems in the RRC layer may be defined as receiving $N_{311}$ consecutive "in-sync" indications for the PCell from lower layers while $T_{310}$ is running. If recovery from physical layer problems is detected, the UE may stop the timer $T_{310}$. In this case, the UE maintains the RRC connection without explicit signaling (e.g., the UE maintains the entire radio resource configuration). Upon $T_{310}$ expiry, the UE may consider radio link failure to be detected and will perform actions upon leaving RRC_CONNECTED or initiate the connection re-establishment procedure.

In Release-11, a time alignment (TA) group is introduced. There is one time alignment timer (TAT) per one TA group. One TA group includes the PCell and may or may not include an SCell. One or more other TA groups, if any, do not include the PCell but include only one or more SCells. A TA group to which the PCell does not belong may have a specific SCell that is designated as a timing reference for the TA group and where the UE operates radio link monitoring. However, it has not previously been clear what happens after the UE detects a physical layer problem through the radio link monitoring in the SCell.

Apart from the PCell, if the UE loses the connection with the SCell, it may not be necessary to leave an RRC_CONNECTED mode or state and the UE can maintain communication by using the PCell or other SCells within another TA group. In Release-10, radio link monitoring of the SCell has been discussed though it was not included in the specification. In Release-10, the deactivation of the SCell or stopping UL transmission of the SCell was discussed as the action for a radio problem of the SCell. At that time, there was no discussion of multiple TA groups or random access on the SCell.

Some unique aspects of the systems and methods disclosed herein may include the following. The UE may stop a TAT of an SCell or consider the TAT of the SCell as expired for the concerned SCell where a physical layer problem is indicated from the RRC to the MAC. The UE may stop a random access procedure on the concerned SCell where a physical layer problem is indicated from RRC to MAC. The UE may not initiate or perform a random access procedure on the concerned SCell where a physical layer problem is indicated from RRC to MAC. An sCellDeactivationTimer (expiry) for the SCell that is the timing reference for TA group may be set to infinity only.

Radio link monitoring for an SCell is described hereafter. In Release-10, there is no radio link monitoring and no radio link failure for any SCells. In Release-11 in a multiple TA scenario, however, the downlink radio link quality of the SCell that is a specific activated or configured SCell within a TA group to which the PCell does not belong and that is a timing reference, may be monitored by the UE physical layer for the purpose of indicating out-of-sync/in-sync status to higher layers (e.g., RRC and/or MAC).

In non-DRX mode operation, the physical layer in the UE may assess the radio link quality for every radio frame, evaluated over the previous time period, against thresholds (e.g., $Q_{out}$ and $Q_{in}$). In DRX mode operation, the physical layer in the UE may assess the radio link quality at least once every DRX period, evaluated over the previous time period, against thresholds (e.g., $Q_{out}$ and $Q_{in}$). If higher-layer signaling indicates certain subframes for restricted radio link monitoring, the radio link quality may not be monitored in any subframe other than those indicated.

The physical (PHY) layer in the UE may, in radio frames where the radio link quality is assessed, indicate out-of-sync to higher layers when the radio link quality is worse than the threshold $Q_{out}$. When the radio link quality is better than the threshold $Q_{in}$, the physical layer in the UE may, in radio frames where the radio link quality is assessed, indicate in-sync to higher layers.

The detection of physical layer problems in RRC_CONNECTED in the RRC layer may be defined as receiving $N_{310}$ consecutive "out-of-sync" indications for the SCell from lower layers (e.g., the physical layer). If physical layer problems are detected, the UE shall start timer $T_{310}$ for the corresponding SCell.

The recovery from physical layer problems in the RRC layer may be defined as receiving a number of (e.g., $N_{311}$) consecutive "in-sync" indications for the SCell from lower layers while $T_{310}$ is running. If the recovery from physical layer problems is detected, the UE may stop a timer $T_{310}$ for the corresponding SCell. Upon $T_{310}$ expiry for a corresponding SCell, the UE may indicate the occurrence of physical layer problems.

Upon receiving $N_{311}$ consecutive "in-sync" indications from lower layers for the SCell after $T_{310}$ for the SCell has last expired, the UE may indicate the recovery from physical layer problems for the SCell to lower layers. For deactivated SCells, the UE may or may not perform radio link monitoring. It should be noted that this recovery procedure after $T_{310}$ for the SCell has last expired may not be needed in an implementation where a cell (e.g., SCell) cannot be recovered without reconfiguration once the radio link problem (e.g., physical layer problem) has occurred in the cell.

In Release-10, there is basically no involvement of the MAC layer for radio link monitoring and radio link failure handling. In Release-11 in a multiple TA scenario, however, the MAC sublayer receives indications from the RRC layer on the occurrence and recovery from physical layer problems for each configured SCell or for each activated SCell. When no occurrence of a physical layer problem is indicated for an SCell, the MAC sublayer operates normally. When the MAC sublayer receives an indication on the occurrence of physical layer problems for an SCell, the MAC sublayer may stop a TAT for the concerned SCell or consider the TAT for the concerned SCell as expired. Furthermore, the MAC sublayer may stop an ongoing random access procedure on the SCell if one is ongoing and may not initiate or perform a random access procedure on the SCell. When the MAC sublayer receives an indication on the recovery from physical layer problems for an SCell, the MAC sublayer resumes normal operation for the concerned SCell.

When the TAT associated with a TA group to which the PCell does not belong expires, SRS transmissions may be stopped on the corresponding SCells and the MAC sublayer may flush the uplink HARQ buffers of the corresponding SCells. Therefore, when the MAC sublayer receives an indication on the occurrence of physical layer problems for an SCell, the MAC sublayer may do one or more of the following. It may stop a TAT of the corresponding TA group. It may avoid starting or restarting a TAT of the corresponding TA group when the UE receives a TA command for the corresponding TA group. It may ignore the received TA command when the UE receives a TA command for the corresponding TA group.

Upon indication of the occurrence of physical layer problems for the SCell, the MAC sublayer may ignore a received physical downlink control channel order (e.g., "PDCCH order") to initiate random access. It may avoid monitoring the PDCCH on the SCell. It may stop SRS transmissions on the SCell(s) in the corresponding TA group. It may flush the uplink HARQ buffers of the SCell(s) in the corresponding TA group. It may stop any ongoing random access procedure on the SCell (if it is ongoing). It may avoid initiating or performing a random access procedure on the SCell. It may avoid performing any uplink transmission including the Random Access Preamble transmission on the SCell. It may keep reporting channel quality indicator, precoding matrix indicator and/or rank indicator (CQI/PMI/RI) information for the SCell (since these reports may be transmitted on the PCell). Upon the occurrence of physical layer problems on an SCell, cells in other TA groups may not be affected.

Deactivation for a special SCell is described hereafter. In Release-10, each SCell has an sCellDeactivationTimer whose value can be 20 milliseconds (ms), 40 ms, 80 ms, 320 ms, 640 ms, 1280 ms or infinity. The sCellDeactivationTimer associated with the SCell may be started or restarted when the SCell is activated. If the sCellDeactivationTimer associated with the activated SCell expires, the UE may deactivate the SCell.

In Release-11, the SCell that is a specific activated or configured SCell within a TA group to which the PCell does not belong and that is a timing reference with the TA group has radio link monitoring. Therefore, for the SCell that is a timing reference or has radio link monitoring, the sCellDeactivationTimer may be always set to infinity. This may be since a deactivation timer may be prepared for a safety mechanism that may be used if the eNB could not deactivate even when UE is out of coverage of the SCell and may not be needed for an SCell that is protected by radio link monitoring. This may mitigate the possibility of misalignment of activation and deactivation status between the UE and the eNB.

Some benefits of the systems and methods disclosed herein are given hereafter. The eNB and the UE can operate well in the scenario that needs to have multiple uplink time alignment. The eNB can allocate resources to the UE for multiple carriers with different physical timing. Furthermore, the systems and methods disclosed herein may reduce the operational cost and/or implementation cost to manage multiple TATs.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a user equipment (UE) 102 in which systems and methods for radio link monitoring may be implemented. The UE 102 communicates with an evolved Node B (eNB) 160 using one or more antennas 122a-n. For example, the UE 102 transmits electromagnetic signals to the eNB 160 and receives electromagnetic signals from the eNB 160 using the one or more antennas 122a-n. The eNB 160 communicates with the UE 102 using one or more antennas 180a-n. It should be noted that the eNB 160 may be a Node B, home evolved Node B (HeNB) or other kind of base station in some configurations. It should be noted that one or more of the elements illustrated as included within the UE 102 or eNB 160 may be implemented in hardware, software or a combination of both.

The UE 102 and the eNB 160 may use one or more cells (e.g., channels, carrier components, etc.) 119, 121 to communicate with each other. For example, the UE 102 and eNB 160 may use the cells 119, 121 to carry one or more channels (e.g., Physical Uplink Control Channel (PUCCH), Physical Uplink Shared Channel (PUSCH), physical downlink control channel (PDCCH), etc.) A PUCCH is one example of a control channel pursuant to 3GPP specifications. Other kinds of channels may be used.

In accordance with the systems and methods disclosed herein, multiple kinds of cells 119, 121 and/or multiple groups of cells 119, 121 may be used for communication. As used herein, the term "group" may denote a group of one or more entities. A primary cell (PCell) may be a primary cell in accordance with 3GPP specifications. A secondary cell (SCell) may be a secondary cell in accordance with 3GPP specifications. One kind of group may include a PCell 119. In some cases, one or more SCells 121 may also be included in a group with a PCell 119. Another kind of group may include one or more SCells 121. As noted above, the uplink of the one or more serving cells 119, 121 in each group may have the same uplink transmission timing. For example, each of one or more SCells 121 in each group may share the same uplink transmission timing. Groups of one or more cells 119, 121 may be referred to as time alignment (TA) groups.

In one case, a single eNB 160 may communicate with the UE 102 using a PCell 119 and one or more SCells 121. In another case, one eNB 160 may communicate with the UE 102 using the PCell 119 (and optionally one or more SCells 121, for example), while another eNB 160 may communicate with the UE 102 using one or more SCells 121.

The UE 102 may include one or more transceivers 118, one or more demodulators 114, one or more decoders 108, one or more encoders 150, one or more modulators 154 and a UE operations module 124. For example, one or more reception and/or transmission paths may be used in the UE 102. For convenience, only a single transceiver 118, decoder 108, demodulator 114, encoder 150 and modulator 154 are illustrated, though multiple parallel elements (e.g., transceivers 118, decoders 108, demodulators 114, encoders 150 and modulators 154) may be used depending on the configuration.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with one or more eNBs 160 using multiple cells 119, 121. The UE operations module 124 may include a radio link quality monitoring module 126, a time alignment (TA) groups module 130, a random access module 132, one or more SCell timers 134 and one or more SCell counters 136.

The radio link quality monitoring module 126 may monitor radio link quality on one or more cells 119, 121. For example, the radio link quality monitoring module 126 may determine a radio link quality for one or more cells 119, 121 based on one or more thresholds 128. In some configurations, the thresholds may include $Q_{out}$ and $Q_{in}$.

The time alignment (TA) groups module 130 may track one or more groups of cells 119, 121. For example, one kind of TA group includes the PCell 119 and may or may not include one or more SCells 121. One or more other TA groups do not include the PCell 119, but include only one or more SCells 121. For convenience, this type of group may be referred to as a "non-PCell TA group." A non-PCell TA group may have a specific SCell 121 that is designated as a timing reference for the TA group and where the UE 102 operates radio link monitoring. There may be one time alignment timer (TAT) per one TA group.

The SCell timers 134 may include timers associated with one or more SCells 121. Examples of SCell timers 134 include time alignment timers (TATs), sCellDeactivation-Timers and $T_{310}$ timers. A TAT that is associated with an SCell that is a designated timing reference may be the TAT used for the corresponding TA group (e.g., for all SCells 121 in a non-PCell TA group).

The SCell counters 136 may include counters associated with one or more SCells 121. Examples of SCell counters 136 include $N_{310}$ counters (for out-of-sync indications) and $N_{311}$ counters (for in-sync indications).

The random access module 132 may perform a random access procedure for communications between an eNB 160 and the UE 102. For example, the random access module 132 may manage sending random access preambles, receiving random access responses and mapping transmission data to random access resources (e.g., an uplink shared channel).

Radio link monitoring for an SCell 121 is described hereafter. In a multiple TA scenario, the downlink radio link quality of an SCell 121 (that is a specific activated or configured SCell 121 that is a timing reference within a non-PCell TA group) may be monitored by the UE 102 physical layer for the purpose of indicating out-of-sync and/or in-sync status to higher layers (e.g., an RRC layer and/or a MAC layer).

In non-DRX mode operation, the physical layer in the UE 102 may assess the radio link quality for every radio frame, evaluated over a previous time period, against thresholds 128 (e.g., $Q_{out}$ and $Q_{in}$). In DRX mode operation, the physical layer in the UE 102 may assess the radio link quality at least once every DRX period, evaluated over the previous time period, against thresholds 128 (e.g., $Q_{out}$ and $Q_{in}$). If higher-layer signaling indicates certain subframes for restricted radio link monitoring, the radio link quality may not be monitored in any subframe other than those indicated.

The physical layer in the UE 102 may, in radio frames where the radio link quality is assessed, indicate out-of-sync to higher layers when the radio link quality is worse than the threshold 128 $Q_{out}$. When the radio link quality is better than the threshold 128 $Q_{in}$, the physical layer in the UE 102 may, in radio frames where the radio link quality is assessed, indicate in-sync to higher layers.

The detection of physical layer problems while in an RRC_CONNECTED state or mode in the RRC layer may be defined as receiving a number (e.g., $N_{310}$) of consecutive "out-of-sync" indications for the SCell 121 as counted by an SCell $N_{310}$ counter 136 from lower layers (e.g., the physical layer). If physical layer problems are detected, the UE 102 may start an SCell $T_{310}$ timer 134 for the corresponding SCell 121.

The recovery from physical layer problems in the RRC layer may be defined as receiving a number of (e.g., $N_{311}$) consecutive "in-sync" indications for the SCell 121 as counted by an SCell $N_{311}$ counter 136 from lower layers while an SCell $T_{310}$ timer 134 is running. If recovery from physical layer problems is detected, the UE 102 may stop an SCell $T_{310}$ timer 134 for the corresponding SCell 121. Upon expiration of an SCell $T_{310}$ timer for a corresponding SCell 121, the UE 102 may indicate the occurrence of physical layer problems.

Upon receiving $N_{311}$ consecutive "in-sync" indications according to an SCell $N_{311}$ counter 136 from lower layers for the SCell 121 after an SCell $T_{310}$ timer 134 for the SCell 121 has last expired, the UE 102 may indicate recovery from physical layer problems for the SCell 121 to lower layers. For deactivated SCells 121, the UE 102 may or may not perform radio link monitoring.

Physical layer problem indication handling for an SCell 121 is described hereafter. In a multiple TA scenario, the MAC sublayer receives indications from the RRC layer on the occurrence of and recovery from physical layer problems for each configured SCell 121 or for each activated SCell 121. When no occurrence of a physical layer problem is indicated for an SCell 121, the MAC sublayer operates normally. When the MAC sublayer receives an indication on the occurrence of physical layer problems for an SCell 121, the MAC sublayer may stop an SCell TAT 134 for the corresponding SCell 121 or consider the SCell TAT 134 for the corresponding SCell 121 as expired. Furthermore, the MAC sublayer may stop an ongoing random access procedure (performed by the random access module 132, for example) on the SCell 121 if one is ongoing and may not initiate or perform a random access procedure on the SCell 121. When the MAC sublayer receives an indication on the recovery from physical layer problems for an SCell 121, the MAC sublayer resumes normal operation for the concerned SCell 121.

When the SCell TAT 134 associated with a non-PCell TA group expires, SRS transmissions may be stopped on the corresponding SCells 121 and the MAC sublayer may flush the uplink HARQ buffers of the corresponding SCells 121. Therefore, when the MAC sublayer receives an indication on the occurrence of physical layer problems for an SCell 121, the MAC sublayer on the UE 102 may do one or more of the following. It may stop an SCell TAT 134 of the corresponding TA group (as indicated by the TA groups module 130, for example). It may avoid starting or restarting an SCell TAT 134 of the corresponding TA group when the UE 102 receives a TA command for the corresponding TA group. It may ignore a received TA command when the UE 102 receives a TA command for the corresponding TA group.

In this case, the MAC sublayer on the UE 102 may ignore a received physical downlink control channel order (e.g., "PDCCH order") to initiate random access. It may avoid monitoring the PDCCH on the SCell 121. It may stop SRS transmissions on the SCell(s) 121 in the corresponding TA group. It may flush the uplink HARQ buffers of the SCell(s) 121 in the corresponding TA group. It may stop any ongoing random access procedure on the SCell (if it is ongoing) 121. It may avoid initiating or performing a random access procedure on the SCell 121. It may avoid performing any uplink transmission including the Random Access Preamble transmission on the SCell 121. It may keep reporting feedback (e.g., channel quality indicator, precoding matrix indicator and/or rank indicator (CQI/PMI/RI)) information for the SCell 121 (since these reports may be transmitted on the PCell 119). Upon the occurrence of physical layer problems on an SCell 121, cells 119, 121 in other TA groups may not be affected.

The SCell 121 that is a specific activated or configured SCell 121 in a non-PCell TA group that is a timing reference for the TA group may have radio link monitoring. Therefore, for the SCell 121 that is a timing reference or has radio link monitoring, the sCellDeactivationTimer (included in the SCell timers 134, for example) may be set to infinity. This may be since a deactivation timer may be prepared for a safety mechanism that may be used if the eNB 160 could not deactivate even when UE 102 is out of coverage of the SCell 121 and may not be needed for an SCell 121 that is protected by radio link monitoring. This may mitigate the possibility of misalignment of activation and deactivation status between the UE 102 and the eNB 160.

In some configurations, the TA groups module 130 may manage time alignment for one or more cells 119, 121. In the case of a random access response, an 11-bit timing advance command $T_A$ may be used as described above. In other cases, a six-bit timing advance command $T_A$ may indicate adjustment of a current $N_{TA}$ value as described above.

In one configuration, the uplink transmission timing for a PUSCH and/or SRS of each SCell 121 in a group with a PCell 119 may be the same as the uplink transmission timing for the corresponding PCell 119. In accordance with the systems and methods disclosed herein, the uplink transmission timing for a PUSCH and/or SRS of each SCell 121 in a non-PCell TA group may share the same uplink transmission timing (with a designated timing reference SCell 121, for example). It should be noted that each serving cell 119, 121 has a downlink and may optionally have an uplink. Furthermore, each serving downlink carrier and uplink carrier may belong to one serving cell 119, 121.

Uplink transmission timing may need to be adjusted since signals from the UE 102 may need to reach one or more eNBs 160 at one or more specified times. For example, all signals being transmitted to an eNB 160 may need to arrive at the same time or within a cyclic prefix in an OFDM symbol at the eNB 160.

A timing advance command in a random access response may be transmitted from an eNB 160 and received by the UE 102 in a PCell 119 or in an SCell 121 after the UE 102 has sent a random access preamble in the PCell 119 or the SCell 121. In one configuration, this random access response may be scheduled by a PDCCH including a random access radio network temporary identifier (RA-RNTI), which is an identifier used for scheduling a PDSCH including a random access response.

The UE operations module 124 may provide information 142 to the encoder 150. This information 142 may include instructions for the encoder 150 and/or data to be encoded. For example, the information 142 may include data to be encoded, such as control data.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, etc. The encoder 150 may provide encoded data 152 to the modulator 154.

The UE operations module 124 may provide information 144 to the modulator 154. This information 144 may include instructions for the modulator 154. For example, the UE operations module 124 may instruct the modulator 154 regarding a modulation type (e.g., constellation mapping). The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158 (e.g., instructions to adjust uplink transmission timing). The one or more transmitters 158 may upconvert and transmit the modulated signal(s) 156 to one or more eNBs 160. It should be noted that the UE 102 may need to have more than one transmitter 158 in order to perform multiple uplink timing adjustments.

Each of the one or more eNBs 160 may include one or more transceivers 176, one or more demodulators 172, one or more decoders 166, one or more encoders 109, one or more modulators 113 and an eNB operations module 182. For example, one or more reception and/or transmission paths may be used in an eNB 160. For convenience, only a single transceiver 176, demodulator 172, decoder 166, encoder 109 and modulator 113 are illustrated, though multiple parallel elements (e.g., transceivers 176, demodulators 172, decoders 166, encoders 109 and modulators 113) may be used depending on the configuration.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data 162. A second eNB-decoded signal 168 may comprise overhead data and/or control data. For example, the second UE-decoded signal 168 may provide data that may be used by the eNB operations module 182 to perform one or more operations.

In general, the eNB operations module 182 may enable the eNB 160 to communicate with a UE 102 that is using one or more cells 119, 121. The eNB operations module 182 may manage the transmission timing for one or more cells 119, 121. For example, the eNB operations module 182 may send a timing adjustment message (e.g., timing advance command) to the UE 102 to adjust the transmission timing for one or more cells 119, 121. For instance, the UE 102 may advance or delay the timing of signals transmitted from the UE 102 corresponding to an eNB 160 based on one or more timing advance commands sent from the eNB 160. The transmission timing may be different between cells 119, 121 (e.g., between groups of cells 119, 121).

In one configuration, the UE 102 may adjust its uplink transmission timing for a physical uplink control channel (PUCCH), physical uplink shared channel (PUSCH) and/or sounding reference signal (SRS) of a primary cell (PCell) 119 based on a timing advance command (e.g., message) from an eNB 160. The timing advance command in a random access response may be transmitted from an eNB 160 to the UE 102 after the UE 102 has sent a random access preamble (to the eNB 160). Another timing advance command (which refers to a timing advance command MAC element) is also transmitted from an eNB 160 to the UE 102 at any time the eNB 160 wants to change the uplink transmission timing of the UE 102. The uplink transmission timing may need to be adjusted from time to time to account for changes in the RF delay as the relative position of the UE 102 changes in respect to a corresponding eNB 160. In this manner, the eNB 160 may provide that all signals from UEs to the eNB 160 reach the eNB 160 at the same time or within a cyclic prefix in an orthogonal frequency division multiplexing (OFDM) symbol, for example In the case of a random access response, an 11-bit timing advance command $T_A$ may be sent from the eNB 160 as described above. In other cases, a six-bit timing advance command $T_A$ may be sent from the eNB 160 and may indicate adjustment of a current $N_{TA}$ value as described above.

A timing advance command in a random access response may be transmitted from an eNB 160 and received by the UE 102 in a PCell 119 or in an SCell 121 after the UE 102 has sent a random access preamble in the PCell 119 or the SCell 121. This random access response may be scheduled by a PDCCH including a random access radio network temporary identifier (RA-RNTI), which is an identifier used for scheduling a PDSCH including a random access response. In some configurations, the PCell 119 or SCell 121 that a random access response is for may be indicated by which serving cell 119, 121 the random access response is scheduled in. A serving cell that the random access response is scheduled in may be indicated by a cell 119, 121 that has a HARQ entity, a PDCCH or a PDSCH for a random access response.

Another timing advance command (e.g., a timing advance command MAC element) may be transmitted from an eNB 160 to the UE 102 at any time an eNB 160 wants to change the UE's 102 uplink transmission timing. Whether the received timing advance command is for the PCell 119 or for an SCell 121 may be indicated based on which serving cell 119, 121 the timing advance command is scheduled in. For example, which cell 119, 121 a timing advance command is for may be indicated by a cell that has a HARQ entity, a PDCCH or a PDSCH for a timing advance command.

The eNB operations module 182 may provide information 101 to the encoder 109. This information 101 may include instructions for the encoder 109 and/or data to be encoded. For example, the eNB operations module 182 may instruct the encoder 109 regarding an encoding rate. Additionally or alternatively, the information 101 may include data to be encoded, such as a message indicating a timing advance command, scheduling information, channel allocations and/or other control information.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may instruct the modulator 113 regarding a modulation type (e.g., constellation mapping). The modulator 113 may modulate the encoded data 111 to provide one or more modulated signals 115 to the one or more transmitters 117.

The eNB operations module 182 may provide information 198 to the one or more transmitters 117. This information 198 may include instructions for the one or more transmitters 117. For example, the eNB operations module 182 may instruct the one or more transmitters 117 to transmit using one or more cells 119, 121. The one or more transmitters 117 may upconvert and transmit the modulated signal(s) 115 to the UE 102.

Figure 2:
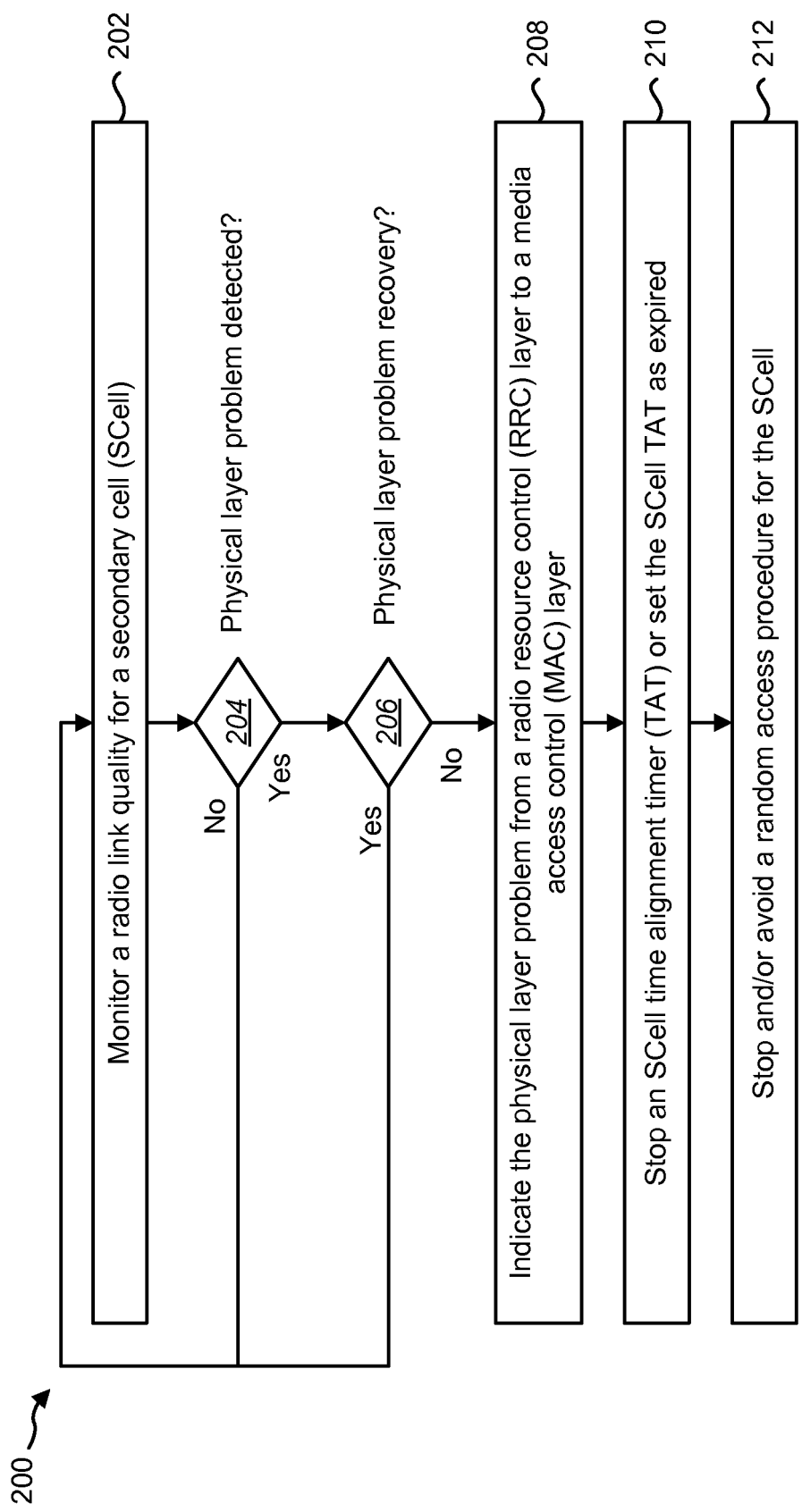
FIG. 2 is a flow diagram illustrating one configuration of a method for radio link monitoring on a user equipment (UE)

FIG. 2 is a flow diagram illustrating one configuration of a method 200 for radio link monitoring on a user equipment (UE) 102. The UE 102 may monitor 202 radio link quality for a secondary cell (SCell) 121. For example, the UE 102 may assess radio link quality corresponding to an SCell 121 based on thresholds 128 $Q_{out}$ and $Q_{in}$ as described above. It should be noted that the UE 102 may continue to monitor 202 radio link quality during one or more steps of the method 200 described herein.

The UE 102 may determine 204 whether a physical layer problem is detected. In some configurations, a physical (PHY) layer on the UE 102 may provide an out-of-sync indication to higher layers each time the assessed radio link quality is worse than $Q_{out}$ and may provide an in-sync indication to higher layers each time the assessed radio link quality is better than $Q_{in}$.

The UE 102 may detect a physical layer problem when it counts a number of (e.g., $N_{310}$) consecutive out-of-sync indications (using an SCell $N_{310}$ counter 136, for example). The out-of-sync indications may be counted, for example, by reception of the out-of-sync indication at the RRC layer from lower layers. If the number of (e.g., $N_{310}$) consecutive out-of-sync indications are not counted, the UE 102 may continue monitoring 202 a radio link quality for the SCell 121.

If a physical layer problem is detected, the UE may optionally determine 206 whether recovery from the physical layer problem has occurred. In some configurations, the UE 102 may start an SCell $T_{310}$ timer 134 upon detection of the physical layer problem and determine whether a number of (e.g., $N_{311}$) consecutive in-sync indications are counted while the SCell $T_{310}$ timer 134 is running. An in-sync indication may be counted, for example, by reception of the in-sync indication at the RRC layer from lower layers.

If the number of (e.g., $N_{311}$) consecutive in-sync indications are counted while the SCell $T_{310}$ timer 134 is running, the UE 102 may determine that recovery from the physical layer problem has occurred. In this case, the UE 102 may stop the SCell $T_{310}$ timer 134 and may continue to monitor 202 radio link quality for an SCell 121.

Recovery from a physical layer problem may not occur when the SCell $T_{310}$ timer 134 expires without recovery from the physical layer problem (e.g., without counting $N_{311}$ consecutive in-sync indications while the SCell $T_{310}$ timer 134 is running). For example, the SCell $T_{310}$ timer 134 may have an expiry value. If this expiry value is reached without counting $N_{311}$ consecutive in-sync indications, the UE 102 may determine 206 that recovery from the physical layer problem has not occurred.

If recovery from the physical layer problem has not occurred, the UE 102 may optionally indicate 208 the physical layer problem from the radio resource control (RRC) layer to a media access control (MAC) layer. For example, the RRC layer may provide a physical layer problem indication to the MAC layer.

It should be noted that determining whether recovery from a physical layer problem has occurred after $T_{310}$ for the SCell has last expired may be optional. It should also be noted that indicating 208 the physical layer problem from the RRC layer to the MAC layer may additionally or alternatively be optional. For example, a cell (e.g., SCell 121) may not be recovered without reconfiguration once the radio link problem (e.g., physical layer problem) has occurred in the cell in some implementations. If the UE 102 determines 204 that a physical layer problem is detected, the UE 102 may proceed to stop 210 an SCell time alignment timer (TAT) 134 or set 210 the SCell TAT as expired. This may be done with or without notifying the MAC layer.

The UE 102 may stop 210 an SCell time alignment timer (TAT) 134 or set 210 the SCell TAT 134 as expired. For example, the UE 102 may stop 210 an SCell TAT 134 that corresponds to the SCell 121 with the physical layer problem. Additionally or alternatively, the UE 102 may set 210 the SCell TAT 134 as expired. For example, the UE 102 may set 210 as expired the SCell TAT 134 that corresponds to the SCell 121 with the physical layer problem.

The UE 102 may stop 212 and/or avoid 212 a random access procedure for the SCell 121 (with the physical layer problem). For example, if a random access procedure is ongoing between the UE 102 and an eNB 160 on the SCell 121 with the physical layer problem, the UE 102 may stop 212 the random access procedure by discontinuing signaling related to the random access procedure. Additionally or alternatively, the UE 102 may avoid 212 a random access procedure by not initiating a random access procedure (e.g., not sending random access signaling to the eNB 160). It should be noted that the method 200 may be performed in parallel (e.g., concurrently) for multiple SCells 121 (e.g., timing reference SCells 121).

It should be noted that the UE 102 may continue to monitor 202 radio link quality even after indication 208 of the physical layer problem (e.g., after expiration of the SCell $T_{310}$ timer 134). The UE 102 may also return to determine 206 whether recovery from the physical layer problem has occurred.

Figure 3:
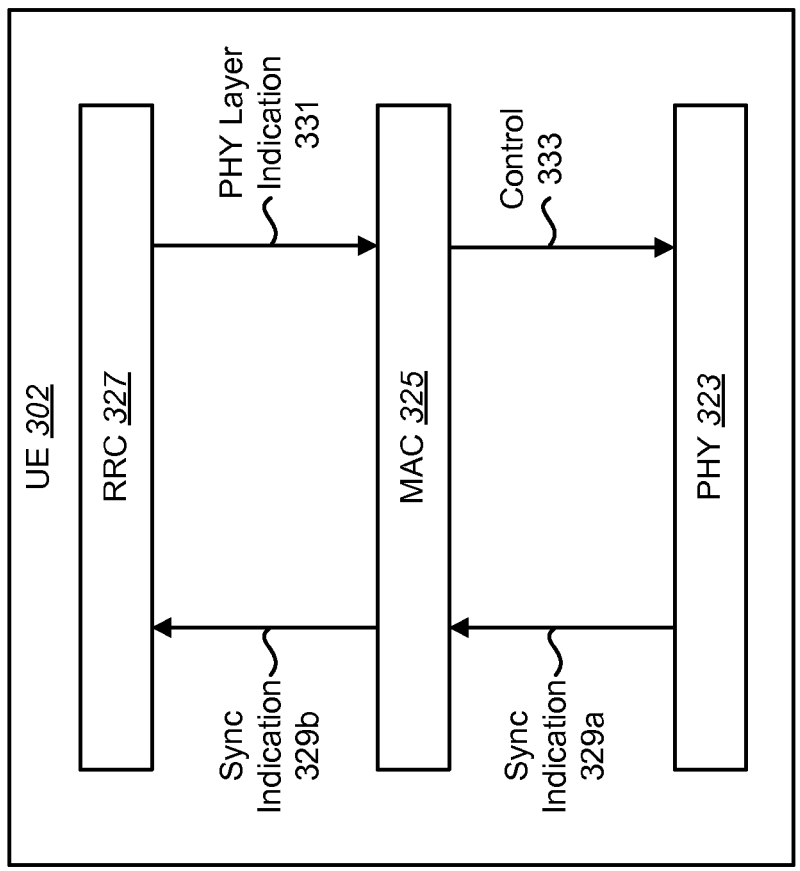
FIG. 3 is a block diagram illustrating one example of a user equipment (UE) in which systems and methods for radio link monitoring may be implemented.

FIG. 3 is a block diagram illustrating one example of a user equipment (UE) 302 in which systems and methods for radio link monitoring may be implemented. The UE 302 illustrated in FIG. 3 may be configured similarly to the UE 102 illustrated in FIG. 1.

UE 302 functionality may be divided into one or more layers and one or more sublayers. For convenience, only a Radio Resource Control (RRC) layer 327, a media access control (MAC) sublayer 325 and the physical (PHY) layer 323 are illustrated in FIG. 3. However, it should be noted that the UE 302 functionality may include additional layers and/or sublayers. It should also be noted that communication (e.g., indications, commands, control information) between layers may pass by way of or through one or more layers in some cases.

As described above, the PHY layer 323 may include functionality for monitoring radio frames and provide a synchronization (e.g., "sync") indication 329a-b to higher layers. For example, the PHY layer 323 may assess a radio frame quality and determine whether the radio frame quality is greater than or less than one or more thresholds 128. For instance, if the radio frame quality is greater than $Q_{in}$, the PHY layer 323 may provide or send an in-sync indication 329a-b to higher layers (e.g., the MAC sublayer 325 and the RRC layer 327) for an SCell 121. Furthermore, if the radio frame quality is less than $Q_{out}$, the PHY layer 323 may provide or send an out-of-sync indication 329a-b to higher layers (e.g., the MAC sublayer 325 and the RRC layer 327) for an SCell 121.

As described above, the RRC layer 327 may start an SCell $T_{310}$ timer 134 if $N_{310}$ consecutive out-of-sync indications 329a-b are received from the PHY layer 323 and MAC sublayer 325. If the RRC layer 327 receives $N_{311}$ consecutive in-sync indications 329a-b for the SCell 121 from lower layers while the SCell $T_{310}$ timer 134 is running, the RRC layer 327 may send a physical (PHY) layer recovery indication 331 to the MAC sublayer 325. In this case, the MAC sublayer 325 may continue or resume normal operations.

If the SCell $T_{310}$ timer 134, which is controlled by the RRC layer 327, expires before reception of $N_{311}$ consecutive in-sync indications 329a-b for the SCell 121, the RRC layer 327 may provide or send a PHY layer problem indication 331 to the MAC sublayer 325.

Upon reception of a PHY layer problem indication 331, the MAC sublayer 325 may perform one or more operations. Additionally or alternatively, the MAC sublayer 325 may provide one or more control indications 333 to the PHY layer 323 in order to perform the one or more operations. For example, when the MAC sublayer 325 receives an indication 331 on the occurrence of physical layer problems for an SCell 121, the MAC sublayer 325 may do one or more of the following. It 325 may stop a TAT of the corresponding TA group. It 325 may avoid starting or restarting a TAT of the corresponding TA group when the UE 102 receives a TA command for the corresponding TA group. It 325 may ignore the received TA command when the UE 102 receives a TA command for the corresponding TA group.

Upon receiving a PHY layer problem indication 331, the MAC sublayer 325 may ignore a received physical downlink control channel order (e.g., "PDCCH order") to initiate random access. It 325 may avoid monitoring the PDCCH on the SCell. It 325 may stop SRS transmissions on the SCell(s) 121 in the corresponding TA group. It 325 may flush the uplink HARQ buffers of the SCell(s) 121 in the corresponding TA group. It 325 may stop any ongoing random access procedure on the SCell 121 (if it is ongoing). It 325 may avoid initiating or performing a random access procedure on the SCell 121. It 325 may avoid performing any uplink transmission including the Random Access Preamble transmission on the SCell 121. It 325 may keep reporting feedback (e.g., channel quality indicator, precoding matrix indicator and/or rank indicator (CQI/PMI/RI)) information for the SCell 121 (since these reports may be transmitted on the PCell 119). Upon the occurrence of physical layer problems on an SCell 121, cells in other TA groups may not be affected.

Figure 4:
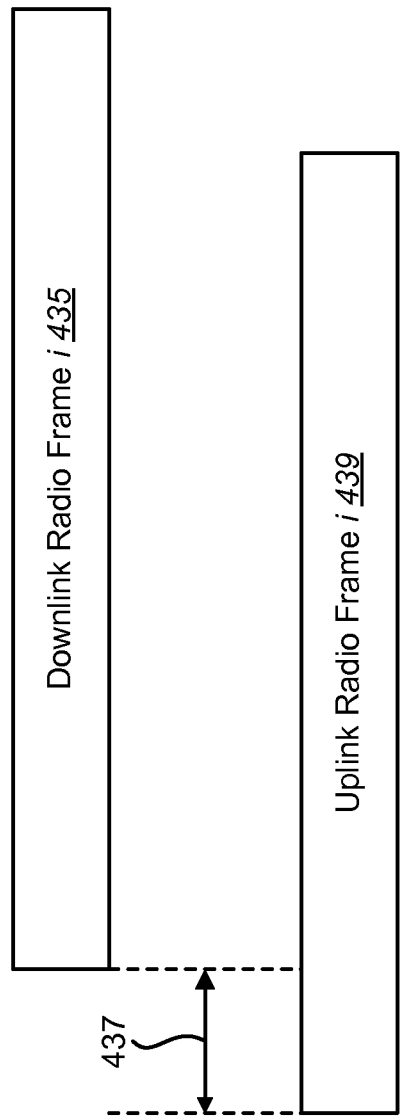
FIG. 4 is a diagram illustrating one example of uplink transmission timing.

FIG. 4 is a diagram illustrating one example of uplink transmission timing. Transmission of an uplink radio frame number i 439 from the UE 102 may start $N_{TA} \times T_s$ seconds 437 before the start of a corresponding downlink radio frame i 435 at the UE 102, where $0 \leq N_{TA} \leq 20512$ and $$T_s = \frac{1}{(15000 \times 2048)} \text{ seconds.}$$

In other words, a UE 102 may begin transmitting an uplink radio frame i 439 $N_{TA} \times T_S$ seconds 437 before receiving a corresponding downlink radio frame i 435. A timing advance command received by the UE 102 may be used to adjust uplink transmission timing.

Figure 5:
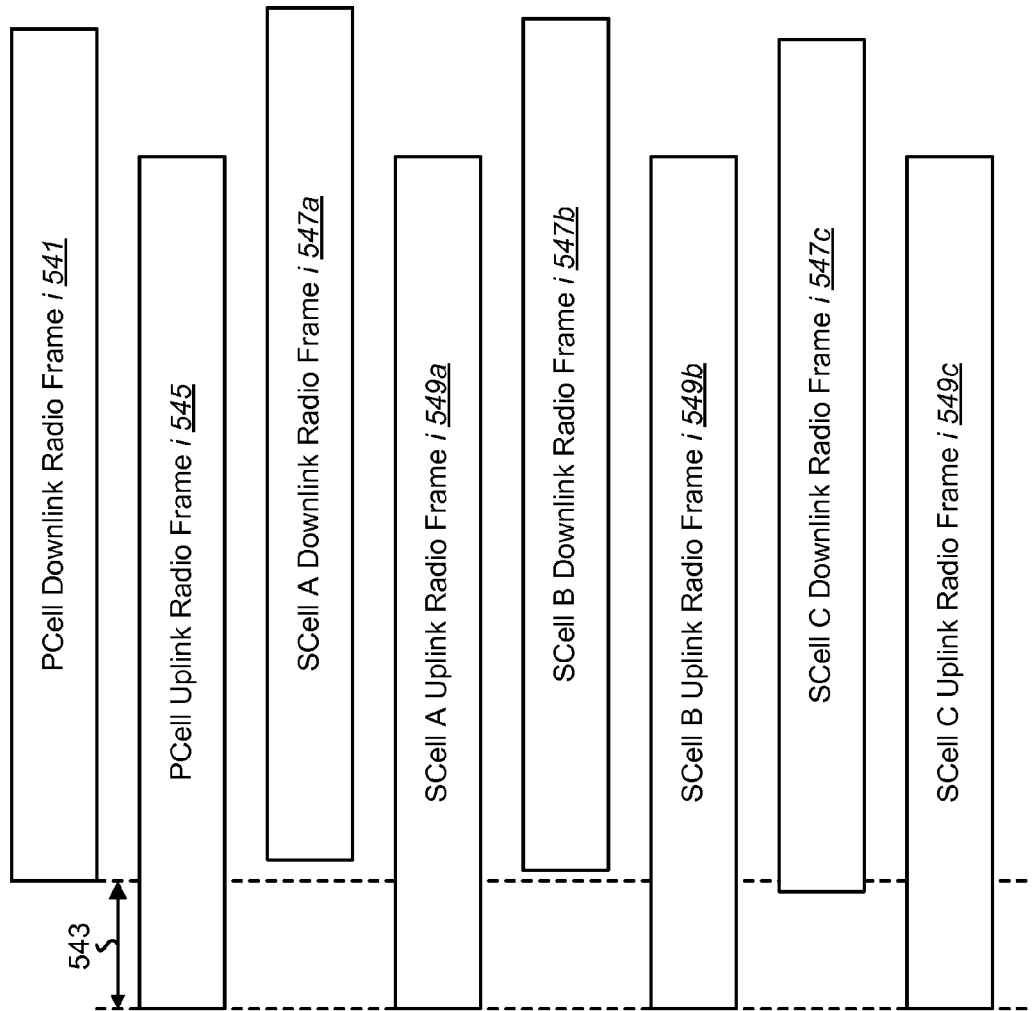
FIG. 5 is a diagram illustrating another example of uplink transmission timing.

FIG. 5 is a diagram illustrating another example of uplink transmission timing. The uplink transmission timing of one or more SCells 121 (e.g., for PUSCH and/or SRS) is the same as the PCell 119. As illustrated in FIG. 5, the transmission of a PCell uplink radio frame number i 545 from the UE 102 may start $N_{TA} \times T_s$ seconds 543 before the start of a corresponding PCell downlink radio frame i 541 at the UE 102. The transmission of one or more SCell uplink radio frames number i 549a-c from the UE 102 may start $N_{TA} \times T_s$ seconds 543 before the start of the PCell downlink radio frame i 541 at the UE 102. As can be observed in FIG. 5, downlink radio frames number i 547a-c for SCells A-C may vary in timing. It should be noted that uplink transmission timing for other SCells 121 (in other TA groups, for example) may be based on the transmission timing for a designated timing reference SCell 121 (instead of the PCell, for instance).

Figure 6:
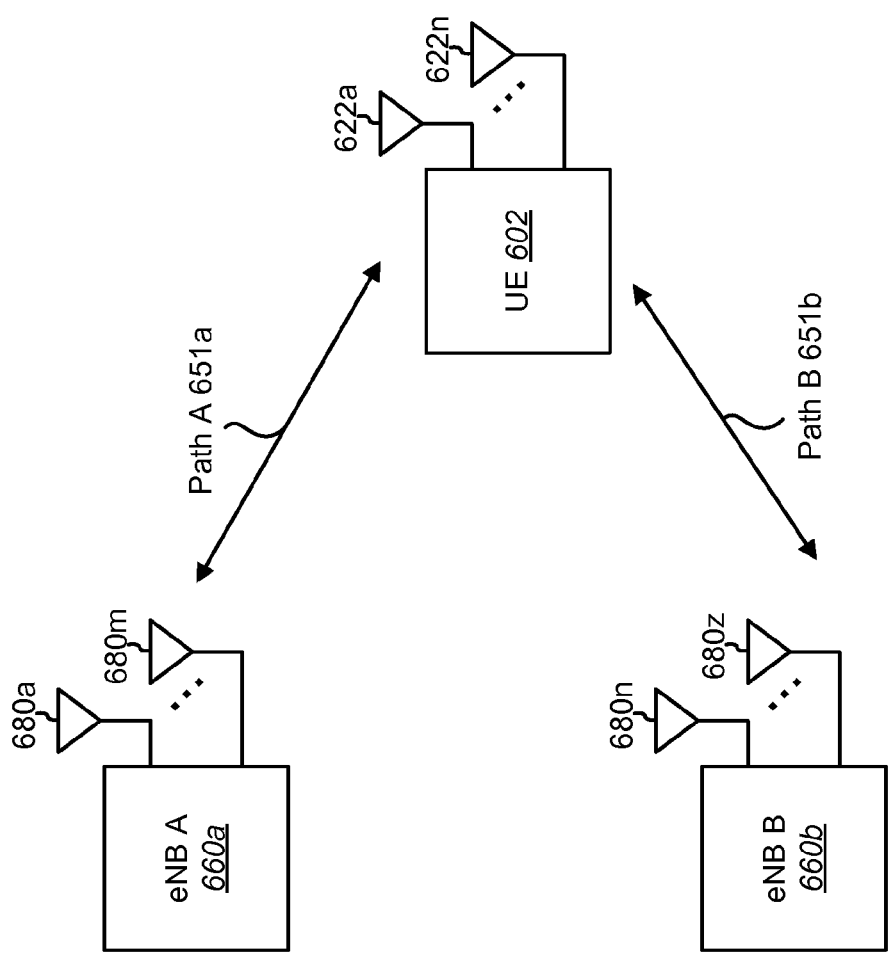
FIG. 6 is a block diagram illustrating one example of a deployment scenario.

FIG. 6 is a block diagram illustrating one example of a deployment scenario. In this example, two eNBs 660a-b may both communicate with a UE 602. eNB A 660a may include one or more antennas 680a-m for communicating with the UE 602. eNB B 660b may include one or more antennas 680n-z for communicating with the UE 602. The UE 602 may include antennas 622a-n for communicating with eNB A 660a and eNB B 660b. In this example, the UE 602 may communicate with two non-collocated sites (e.g., eNBs 660a-b) on multiple carriers. As can be observed, each communication path 651a-b may experience different propagation environments. This may lead to differences in uplink transmission timing for communication frames on path A 651a and path B 651b. In one configuration, one group of cells or channels may be established on path A 651a, while another group of cells or channels may be established on path B 651b. The scenario illustrated in FIG. 6 could similarly occur with remote antennas or remote radio heads.

Figure 7:
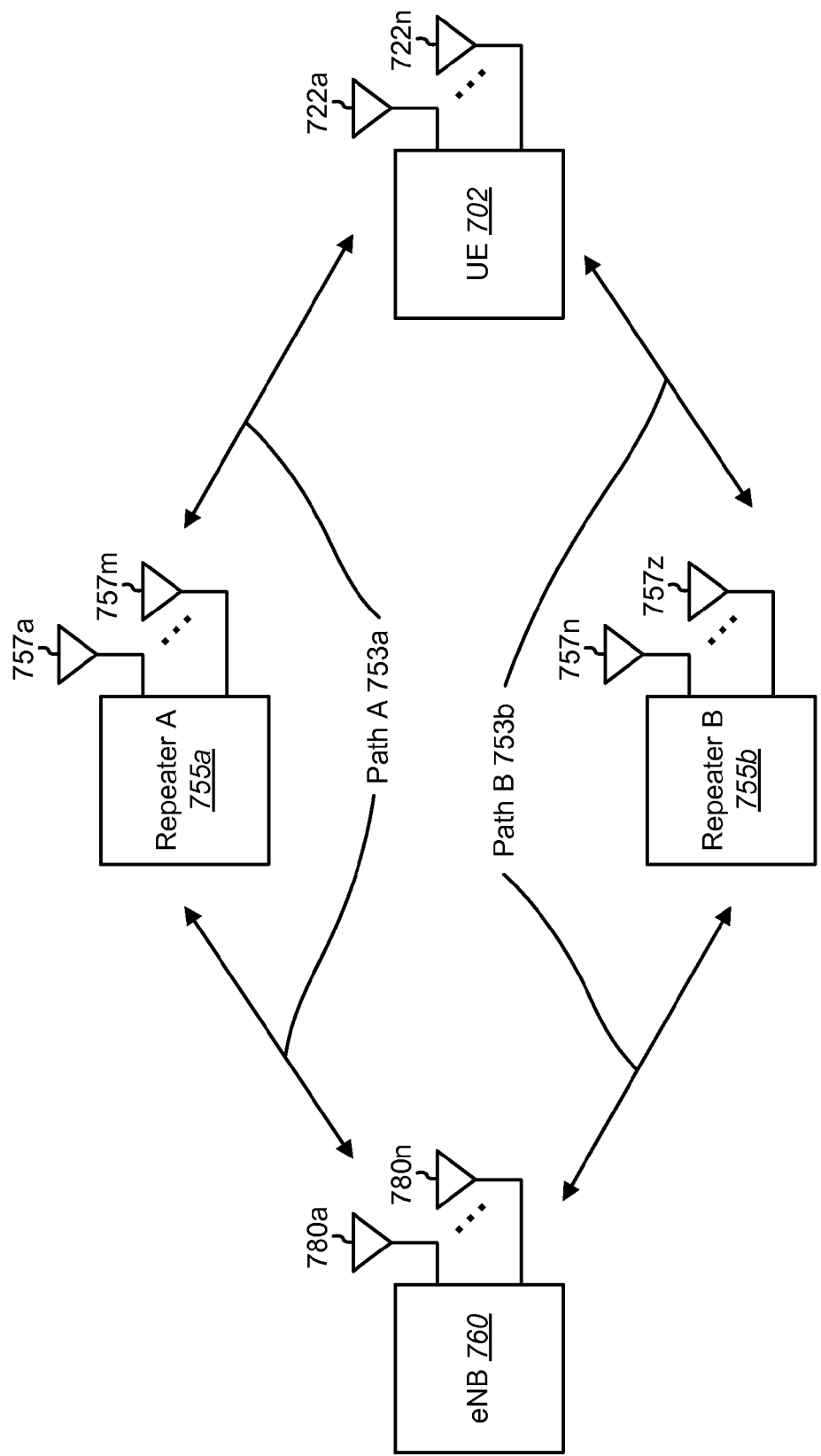
FIG. 7 is a block diagram illustrating another example of a deployment scenario.

FIG. 7 is a block diagram illustrating another example of a deployment scenario. In this example, an eNB 760 may communicate with a UE 702 using multiple signals. The eNB 760 may include one or more antennas 780a-n for communicating with the UE 702 via repeaters A and B 755a-b. Repeater A 755a may include one or more antennas 757a-m for communicating with the eNB 760 and/or the UE 702. Repeater B 755b may include one or more antennas 757n-z for communicating with the eNB 760 and/or the UE 702. The UE 702 may include antennas 722a-n for communicating with the eNB 760 via repeaters A and B 755a-b. In this example, the UE 702 may communicate with the eNB 760 over paths A and B 753a-b. As can be observed, each communication path 753a-b may experience different propagation environments. This may lead to differences in uplink transmission timing for communication frames on path A 753a and path B 753b. For example, different component carriers could see substantially different propagation environments between path A 753a and path B 753b due to different frequency-selective repeaters 755a-b and hence experience different time-of-flights. In one configuration, one group of cells or channels may be established on path A 753a, while another group of cells or channels may be established on path B 753b.

Figure 8:
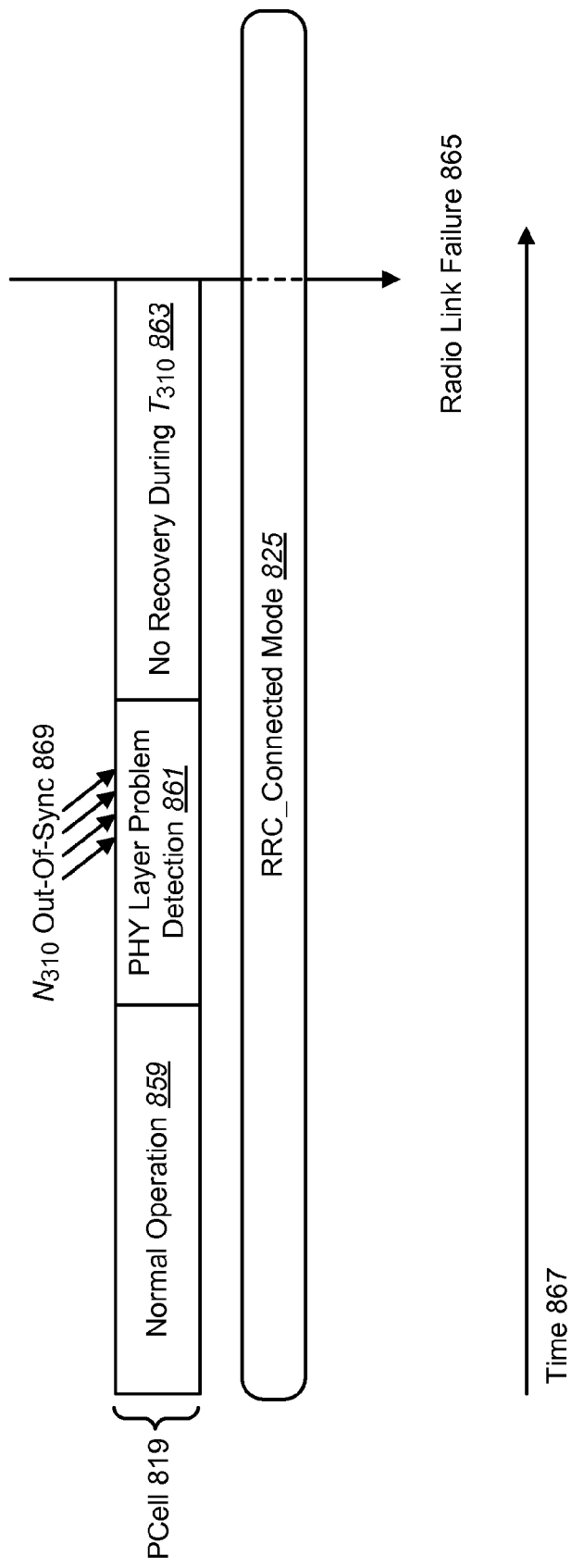
FIG. 8 is a diagram illustrating one example of radio link monitoring for a primary cell (PCell) over time.

FIG. 8 is a diagram illustrating one example of radio link monitoring for a primary cell (PCell) 819 over time 867. In Release-10, radio link monitoring and radio link failure handling is done by the UE only in a primary cell (PCell) 819. The downlink radio link quality of the PCell 819 may be monitored by the UE physical layer for the purpose of indicating out-of-sync/in-sync status to higher layers (e.g., radio resource control (RRC) and/or media access control (MAC)).

In non-discontinuous reception (non-DRX) mode operation, the physical layer in the UE may assess the radio link quality for every radio frame, evaluated over a previous time period, against thresholds (e.g., $Q_{out}$ and $Q_{in}$). In discontinuous reception (DRX) mode operation, the physical layer in the UE may assess radio link quality at least once every DRX period, evaluated over the previous time period, against thresholds (e.g., $Q_{out}$ and $Q_{in}$). If higher-layer signaling indicates certain subframes for restricted radio link monitoring, the radio link quality may not be monitored in any subframe other than those indicated.

The physical layer in the UE may (in radio frames where the radio link quality is assessed) indicate out-of-sync to higher layers when the radio link quality is worse than the threshold $Q_{out}$. When the radio link quality is better than the threshold $Q_{in}$, the physical layer in the UE may (in radio frames where the radio link quality is assessed) indicate in-sync to higher layers. As illustrated in FIG. 8, a UE may continue in normal operation 859 for the PCell 819 while radio problems are not detected.

The detection of physical layer problems while in an RRC_CONNECTED mode 825 in the RRC layer may be defined as receiving $N_{310}$ consecutive "out-of-sync" indications 869 for the PCell 819 from lower layers (e.g., the physical layer). For instance, receiving $N_{310}$ consecutive "out-of-sync" indications 869 for the PCell 819 may result in detection 861 of a physical layer problem. If a physical layer problem is detected, the UE may start a timer $T_{310}$.

Recovery from physical layer problems in the RRC layer may be defined as receiving $N_{311}$ consecutive "in-sync" indications for the PCell 819 from lower layers while $T_{310}$ is running. If recovery from physical layer problems is detected, the UE may stop the timer $T_{310}$. In this case, the UE maintains the RRC connection without explicit signaling (e.g., the UE maintains the entire radio resource configuration). Upon $T_{310}$ expiry (e.g., no recovery during $T_{310}$ 863), the UE may consider radio link failure 865 to be detected and will perform operations upon leaving the RRC_CONNECTED mode 825 or initiate the connection re-establishment procedure.

Figure 9:
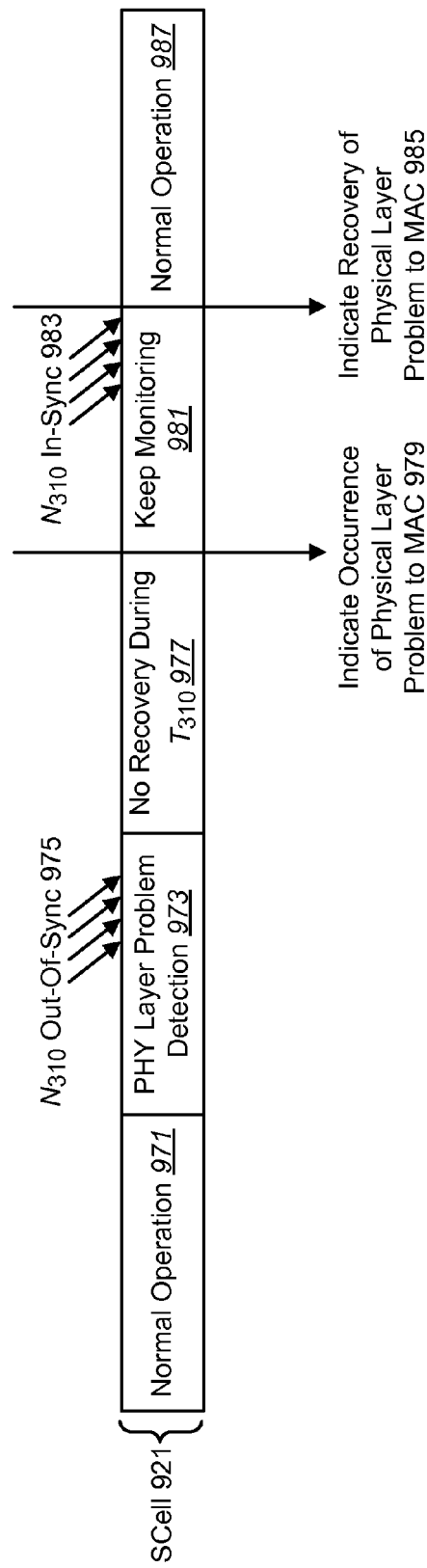
FIG. 9 is a diagram illustrating one example of radio link monitoring for a secondary cell (SCell) in accordance with the systems and methods disclosed herein.

FIG. 9 is a diagram illustrating one example of radio link monitoring for a secondary cell (SCell) 921 in accordance with the systems and methods disclosed herein. In Release-10, there is no radio link monitoring and no radio link failure for any SCells. In Release-11 in a multiple TA scenario, however, the downlink radio link quality of the SCell 921 that is a specific activated or configured SCell 921 within a non-PCell TA group that is a timing reference may be monitored by the UE 102 physical layer for the purpose of indicating out-of-sync/in-sync status to higher layers (e.g., RRC and/or MAC).

In non-DRX mode operation, the physical layer in the UE 102 may assess the radio link quality for every radio frame, evaluated over the previous time period, against thresholds (e.g., $Q_{out}$ and $Q_{in}$). In DRX mode operation, the physical layer in the UE 102 may assess the radio link quality at least once every DRX period, evaluated over the previous time period, against thresholds (e.g., $Q_{out}$ and $Q_{in}$). If higher-layer signaling indicates certain subframes for restricted radio link monitoring, the radio link quality may not be monitored in any subframe other than those indicated.

The physical layer in the UE 102 may, in radio frames where the radio link quality is assessed, indicate out-of-sync to higher layers when the radio link quality is worse than the threshold $Q_{out}$. When the radio link quality is better than the threshold $Q_{in}$, the physical layer in the UE 102 may, in radio frames where the radio link quality is assessed, indicate in-sync to higher layers. As illustrated in FIG. 9, the UE 102 may continue in normal operation 971 while radio problems are not detected.

The detection 973 of physical layer problems while in an RRC_CONNECTED mode in the RRC layer may be defined as receiving $N_{310}$ consecutive "out-of-sync" indications 975 for the SCell 921 from lower layers (e.g., the physical layer). For instance, receiving $N_{310}$ consecutive "out-of-sync" indications 975 for the SCell 921 may result in detection 973 of a physical layer problem. If a physical layer problem is detected 973, the UE 102 may start an SCell $T_{310}$ timer 134 for the corresponding SCell 921.

The recovery from physical layer problems in the RRC layer may be defined as receiving $N_{311}$ consecutive "in-sync" indications for the SCell 921 from lower layers while the SCell $T_{310}$ timer 134 is running. If the recovery from physical layer problems is detected, the UE 102 may stop the SCell $T_{310}$ timer 134 for the corresponding SCell 921. However, upon SCell $T_{310}$ timer 134 expiry for a corresponding SCell 921 (e.g., for no recovery during $T_{310}$ 977), the UE 102 may indicate the occurrence 979 of physical layer problems from the RRC layer to the MAC sublayer. As illustrated in FIG. 9, the UE 102 may keep monitoring 981 the SCell 921, even after the expiration of the SCell $T_{310}$ timer 134.

Upon receiving $N_{311}$ consecutive "in-sync" indications 983 from lower layers for the SCell 921 after $T_{310}$ for the SCell 921 has last expired, the UE 102 may indicate recovery 985 from physical layer problems for the SCell 921 to lower layers (from the RRC layer to the MAC sublayer, for example). The UE 102 may then resume normal operation 987. As described above, it should be noted that this recovery procedure after $T_{310}$ for the SCell 921 has last expired may be optional. For deactivated SCells, the UE 102 may or may not perform radio link monitoring.

Figure 10:
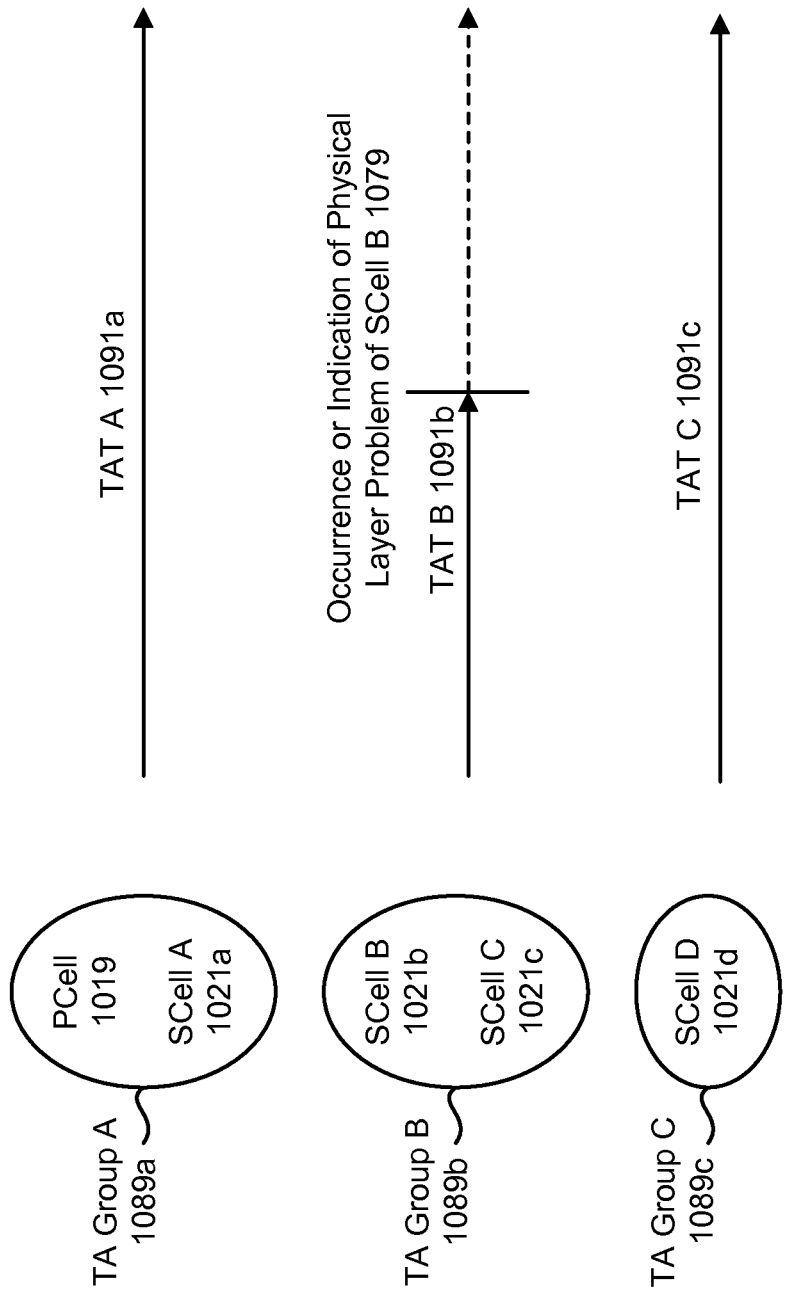
FIG. 10 is a diagram illustrating one example of radio link monitoring for an SCell in the context of multiple time alignment (TA) groups.

FIG. 10 is a diagram illustrating one example of radio link monitoring for an SCell 1021b in the context of multiple time alignment (TA) groups 1089a-c. In FIG. 10, TA group A 1089a includes the PCell 1019 and SCell A 1021a. TA group B 1089b includes SCell B 1021b (which is a timing reference for TA group B 1089b) and SCell C 1021c. Furthermore, TA group C 1089c includes SCell D 1021d.

As illustrated in this example, each TA group 1089a-c uses a corresponding time alignment timer (TAT) 1091a-c. More specifically, TA group A 1089a utilizes TAT A 1091a, which is the TAT for the PCell 1019. Additionally, TA group B 1089b uses TAT B 1091b, which is the TAT for SCell B 1021b. Furthermore, TA group C 1089c uses TAT C 1091c, which is the TAT for SCell D 1021d.

In this example, the cells 1019, 1021a-d continue in normal operation until the occurrence or indication 1079 of a physical layer problem for SCell B 1021b. This physical (PHY) layer problem is indicated to a MAC sublayer by an RRC layer. In this example, the MAC sublayer stops TAT B 1091b or sets TAT B 1091b as expired. As illustrated in this example, the occurrence 1079 of the physical layer problem does not affect TA group A 1089a or TA group C 1089c.

Figure 11:
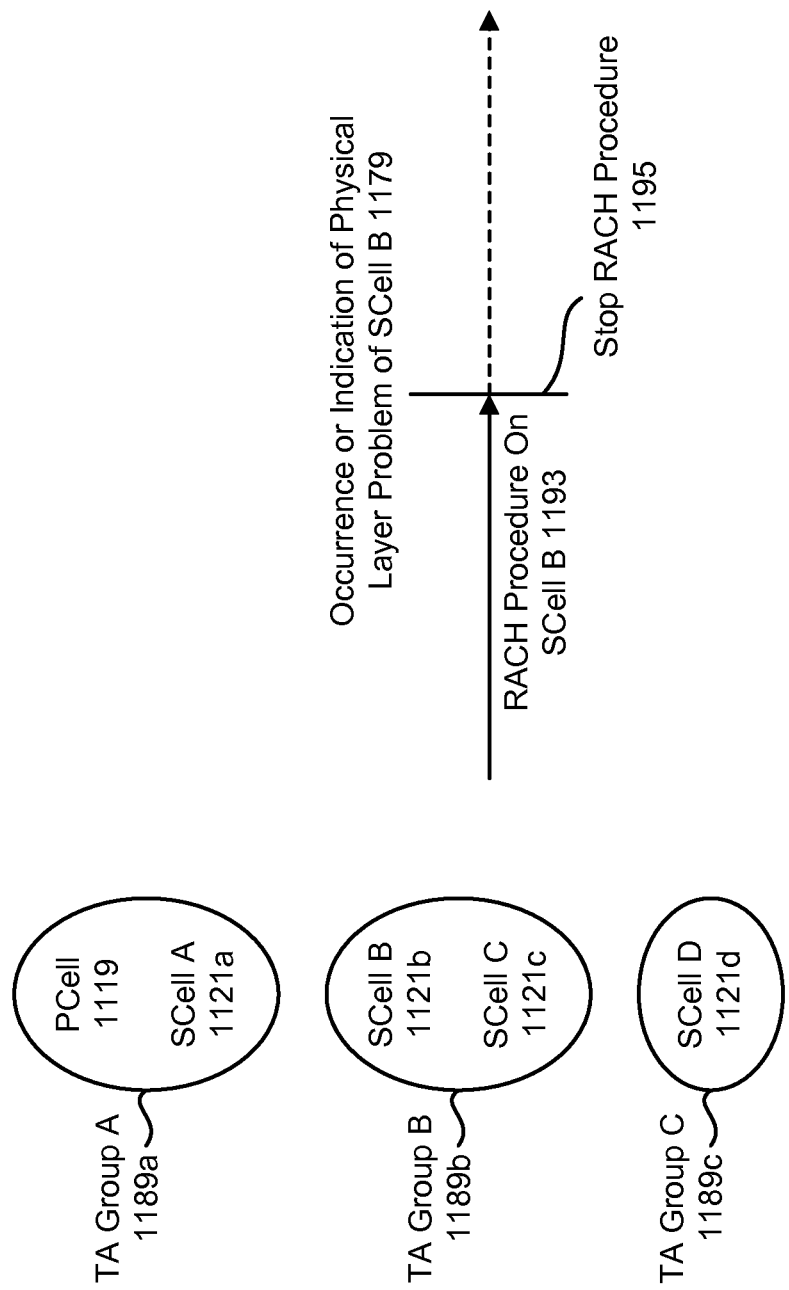
FIG. 11 is a diagram illustrating another example of radio link monitoring for an SCell in the context of multiple time alignment (TA) groups.

FIG. 11 is a diagram illustrating another example of radio link monitoring for an SCell 1121b in the context of multiple time alignment (TA) groups 1189a-c. In FIG. 11, TA group A 1189a includes the PCell 1119 and SCell A 1121a. TA group B 1189b includes SCell B 1121b (which is a timing reference for TA group B 1189b) and SCell C 1121c. Furthermore, TA group C 1189c includes SCell D 1121 d.

In this example, the UE 102 may be performing 1193 a random access channel (RACH) procedure on SCell B 1121b until the occurrence or indications 1179 of a physical layer problem for SCell B 1121b. This physical (PHY) layer problem is indicated to a MAC sublayer by an RRC layer. In this example, the MAC sublayer stops 1195 the RACH procedure upon the indication of the physical layer problem. Additional or alternative operations may be performed upon the occurrence or indication 1179 of a physical layer problem as described above.

Figure 12:
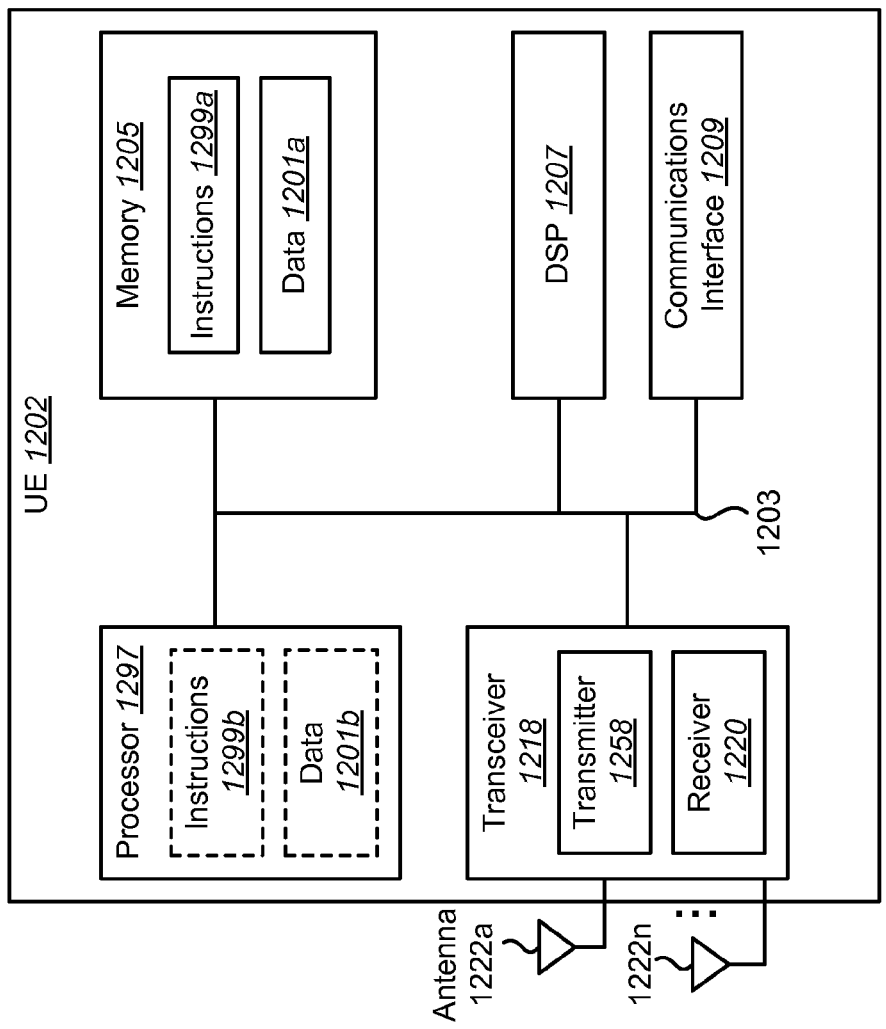
FIG. 12 illustrates various components that may be utilized in a user equipment (UE)

FIG. 12 illustrates various components that may be utilized in a user equipment (UE) 1202. The UE 1202 may be utilized as one or more of the UEs 102, 302, 602, 702 described above. The UE 1202 includes a processor 1297 that controls operation of the UE 1202. The processor 1297 may also be referred to as a central processing unit (CPU). Memory 1205, which may include read-only memory (ROM), random access memory (RAM), a combination of the two or any type of device that may store information, provides instructions 1299a and data 1201a to the processor 1297. A portion of the memory 1205 may also include non-volatile random access memory (NVRAM). Instructions 1299b and data 1201b may also reside in the processor 1297. Instructions 1299b and/or data 1201*b* loaded into the processor 1297 may also include instructions 1299*a* and/or data 1201*a* from memory 1205 that were loaded for execution or processing by the processor 1297. The instructions 1299*b* may be executed by the processor 1297 to implement the systems and methods disclosed herein.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222*a-n* are attached to the housing and electrically coupled to the transceiver 1218.

The various components of the UE 1202 are coupled together by a bus system 1203, which may include a power bus, a control signal bus and a status signal bus, in addition to a data bus. However, for the sake of clarity, the various buses are illustrated in FIG. 12 as the bus system 1203. The UE 1202 may also include a digital signal processor (DSP) 1207 for use in processing signals. The UE 1202 may also include a communications interface 1209 that provides user access to the functions of the UE 1202. The UE 1202 illustrated in FIG. 12 is a functional block diagram rather than a listing of specific components.

Figure 13:
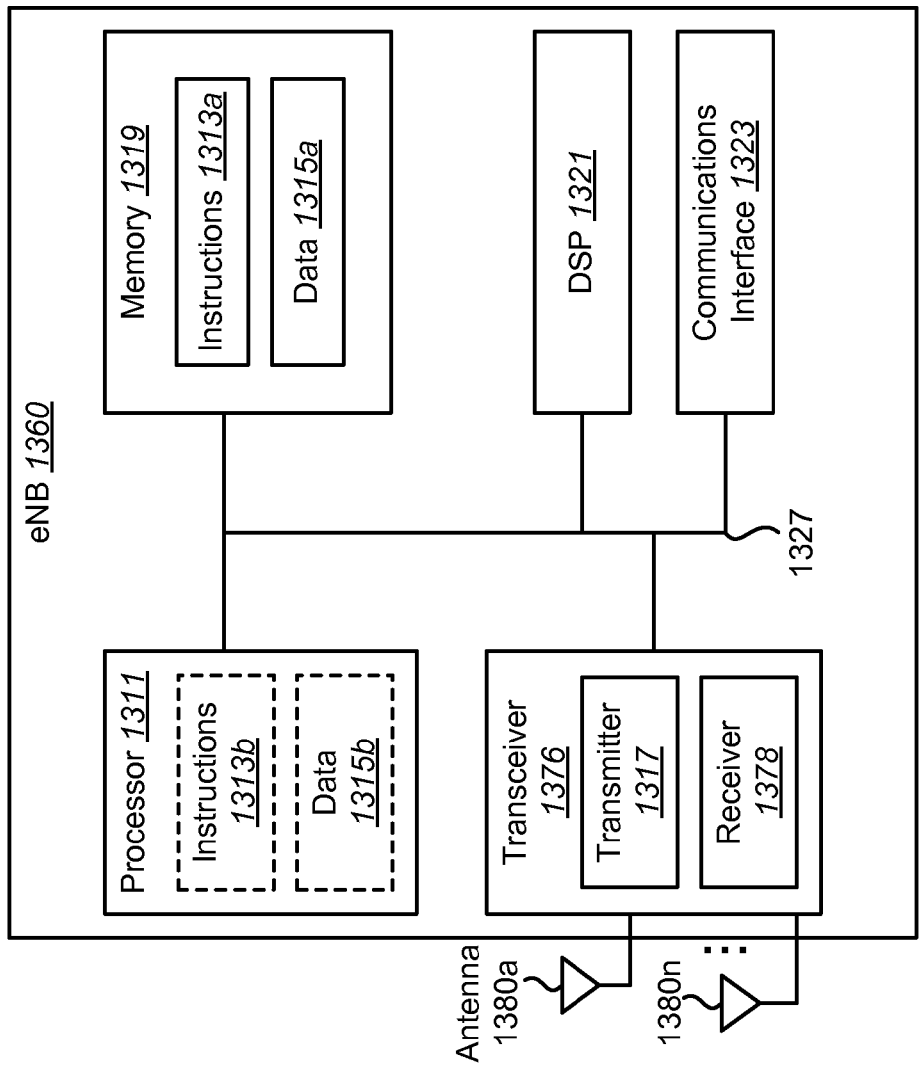
FIG. 13 illustrates various components that may be utilized in an evolved Node B (eNB).

FIG. 13 illustrates various components that may be utilized in an evolved Node B (eNB) 1360. The eNB 1360 may be utilized as one or more of the eNBs 160, 660, 760 described previously. The eNB 1360 may include components that are similar to the components discussed above in relation to the UE 1202, including a processor 1311, memory 1319 that provides instructions 1313*a* and data 1315*a* to the processor 1311, instructions 1313*b* and data 1315*b* that may reside in or be loaded into the processor 1311, a housing that contains one or more transmitters 1317 and one or more receivers 1378 (which may be combined into one or more transceivers 1376), one or more antennas 1380*a-n* electrically coupled to the transceiver(s) 1376, a bus system 1327, a DSP 1321 for use in processing signals, a communications interface 1323 and so forth.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) configured for radio link monitoring, comprising:
a processor;
memory in electronic communication with the processor;
instructions stored in the memory, the instructions being executable to:
monitor a radio link quality for a primary cell (PCell);
monitor the radio link quality for a secondary cell that is different from the PCell and is a timing reference for a time alignment (TA) group that does not include the PCell;
determine whether a physical layer problem is detected based on the radio link quality for the secondary cell; and based on a detection of a physical layer problem for the secondary cell:
stop a time alignment timer (TAT) corresponding to the TA group or consider the time alignment timer (TAT) corresponding to the TA group as expired.

2. The UE of claim 1, wherein based on a detection of the physical layer problem, the instructions are further executable to stop an ongoing random access procedure on the secondary cell.

3. The UE of claim 1, wherein the instructions executable to determine whether a physical layer problem is detected comprise instructions executable to determine whether a number of consecutive out-of-sync indications for the PCell are received, while in a radio resource control (RRC) connected state, from the physical layer.

4. A method for radio link monitoring on a user equipment (UE), comprising:
monitoring a radio link quality for a primary cell (PCell);
monitoring the radio link quality for a secondary cell that is different from the PCell and is a timing reference for a time alignment (TA) group that does not include the PCell;
determining whether a physical layer problem for the secondary cell is detected based on the radio link quality; and based on a detection of a physical layer problem for the secondary cell:
stopping a time alignment timer (TAT) corresponding to the TA group or considering the time alignment timer (TAT) corresponding to the TA group as expired.

5. The method of claim 4, wherein based on a detection of the physical layer problem, the method further comprises stopping an ongoing random access procedure on the secondary cell.

6. A non-transitory, tangible computer-readable medium for radio link monitoring, comprising executable instructions for:
monitoring a radio link quality for a primary cell (PCell);
monitoring the radio link quality for a secondary cell that is different from the PCell and is a timing reference for a time alignment (TA) group that does not include the PCell;

determining whether a physical layer problem is detected based on the radio link quality for the secondary cell; and based on a detection of a physical layer problem for the secondary cell:

stopping a time alignment timer (TAT) corresponding to the TA group or considering the time alignment timer (TAT) corresponding to the TA group as expired.

7. The computer-readable medium of claim 6, wherein based on a detection of the physical layer problem, the executable instructions are further executable to stop an ongoing random access procedure on the secondary cell.

* * * * *